(12) United States Patent
Holtmanns et al.

(10) Patent No.: US 7,885,640 B2
(45) Date of Patent: Feb. 8, 2011

(54) AUTHENTICATION IN COMMUNICATION NETWORKS

(75) Inventors: Silke Holtmanns, Klaukkala (FI); Vladimir Bashkirov, Helsinki (FI)

(73) Assignee: Nokia Corporation, Espoo (FI)

( * ) Notice: Subject to any disclaimer, the term of this patent is extended or adjusted under 35 U.S.C. 154(b) by 288 days.

(21) Appl. No.: 11/652,223

(22) Filed: Jan. 11, 2007

(65) Prior Publication Data

US 2008/0171534 A1     Jul. 17, 2008

(51) Int. Cl.
    *H04M 1/66*    (2006.01)
(52) U.S. Cl. .............................. 455/411; 726/4; 726/5; 713/153
(58) Field of Classification Search ......... 455/410–411, 455/433, 115, 142.05; 713/115, 169, 183, 713/168, 182, 153; 379/142.05; 370/349; 726/4–5
See application file for complete search history.

(56) References Cited

U.S. PATENT DOCUMENTS

| | | | |
|---|---|---|---|
| 2004/0015692 A1* | 1/2004 | Green et al. | 713/169 |
| 2004/0203923 A1* | 10/2004 | Mullen | 455/456.1 |
| 2005/0086194 A1* | 4/2005 | Suzuki et al. | 707/1 |
| 2005/0246548 A1* | 11/2005 | Laitinen | 713/182 |
| 2005/0278420 A1* | 12/2005 | Hartikainen et al. | 709/203 |
| 2006/0013191 A1* | 1/2006 | Kavanagh | 370/349 |
| 2006/0182280 A1* | 8/2006 | Laitinen et al. | 380/247 |
| 2006/0196931 A1* | 9/2006 | Holtmanns et al. | 235/380 |
| 2006/0236116 A1* | 10/2006 | Patel | 713/183 |
| 2006/0282882 A1 | 12/2006 | Bajko et al. | 726/4 |
| 2007/0101122 A1* | 5/2007 | Guo | 713/153 |
| 2007/0118744 A1* | 5/2007 | Huang | 713/168 |
| 2009/0019167 A1* | 1/2009 | Taaghol | 709/228 |

FOREIGN PATENT DOCUMENTS

| | | |
|---|---|---|
| WO | WO 2005/104425 A2 | 11/2005 |
| WO | WO-2006/084183 A1 | 8/2006 |
| WO | WO 2006084183 A1 * | 8/2006 |

OTHER PUBLICATIONS

3GPP TS 29.109, V7.4.0 (Sep. 2006), 3$^{rd}$ Generation Partnership Project; Technical Specification Group Core Network and Terminals; Generic Authentication Architecture (GAA); Zh and Zn Interfaces based on the Diameter protocol; Stage 3 (Release 7), 43 pgs.

(Continued)

*Primary Examiner*—Jinsong Hu
*Assistant Examiner*—Nathan Taylor
(74) *Attorney, Agent, or Firm*—Harrington & Smith (57) ABSTRACT

Disclosed is a method including receiving an authentication bootstrapping request related to a subscriber, requesting authentication information of the subscriber from a subscriber database, requesting security settings of the subscriber from a security setting database, receiving a response at least from one of the subscriber database and the security setting database, and proceeding with authentication bootstrapping at least partially on the basis of response(s) received. Also disclosed are related apparatuses, systems and computer programs.

20 Claims, 5 Drawing Sheets

OTHER PUBLICATIONS

3GPP TS 33.220, V7.6.0 (Dec. 2006), "3$^{rd}$ Generation Partnership Project; Technical Specification Group Services and System Aspects; Generic Authentication Architecture (GAA); Generic bootstrapping architecture (Release 7)", 72 pgs.

3GPP TR 33.920, V7.1.0 (Jun. 2006), "3$^{rd}$ Generation Partnership Project; Technical Specification Group Services and System Aspects; SIM card based Generic Bootstrapping Architecture (GBA) Early implementation feature (Release 7")", 7 pgs.

3GPP2 S.P0114-0 Version 0.4, "Security Mechanisms Using GBA", Dec. 8, 2005, pp. 1-15.

* cited by examiner

AUTHENTICATION IN COMMUNICATION NETWORKS

FIELD OF THE INVENTION

The present invention generally relates to authentication in communication networks.

BACKGROUND OF THE INVENTION

In communication networks a number of applications share a need for authentication between a client (that is, the end user device or user equipment, UE) and an application server before further communication can take place. For providing a peer authentication mechanism 3GPP (3G Partnership Project) has defined a Generic Authentication Architecture (GAA) and Generic Bootstrapping Architecture (GBA). GAA/GBA describes a generic architecture for peer authentication that can a priori serve for any (present and future) application. GAA/GBA is based on mobile algorithms AKA (Authentication and Key Agreement) for 3GPP and CHAP (Challenge Handshake Authentication Protocol) and CAVE (Cellular Authentication and Voice Encryption) for 3GPP2. Additionally there is a username/password variant of GAA/GBA defined by Cable Labs.

GAA/GBA is specified to be used with a Home Subscriber System (HSS) and diameter access. A new network element called the Bootstrapping Server Function (BSF) is introduced in GAA/GBA. This BSF has a diameter base interface with the HSS. The bootstrapping procedure of the GAA/GBA is specified in 3GPP TS 29.109 v 7.4.0.

Figure 1:
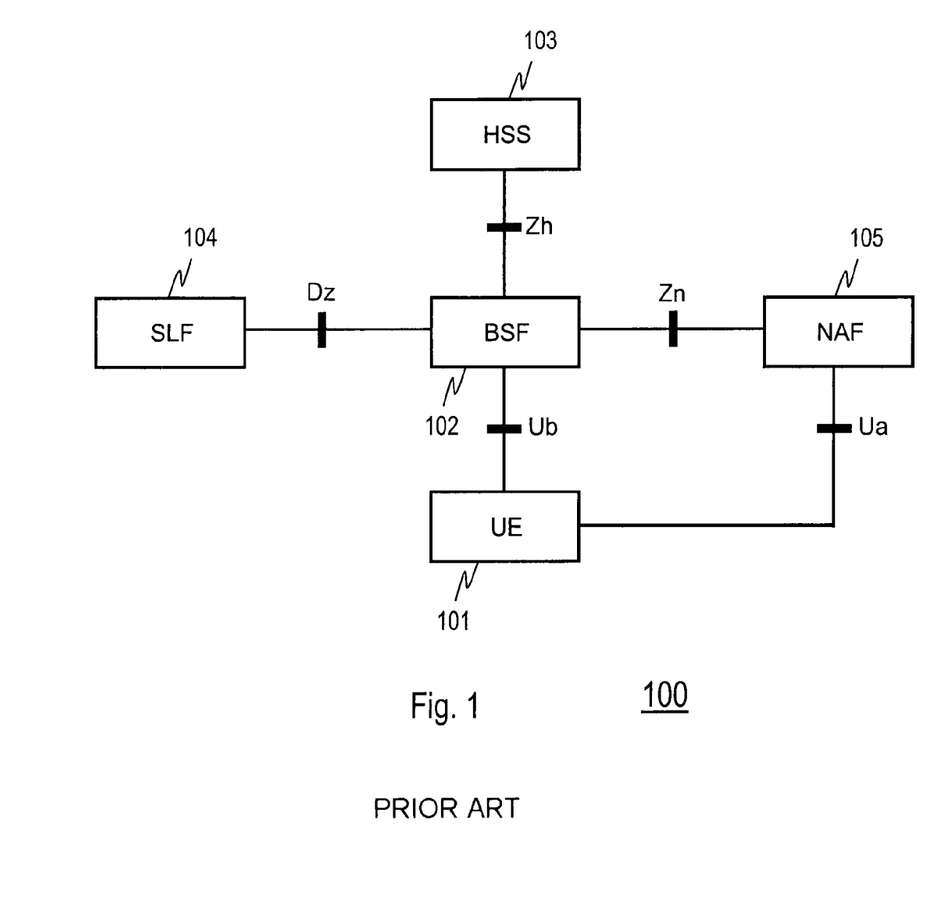
FIG. 1 shows a system according to prior art.

FIG. 1 shows a simplified block diagram of a GAA/GBA system 100 according to 3GPP specifications. The system comprises a user equipment (UE) 101 that has a Ub interface to a Bootstrapping Server Function (BSF) 102 and a Ua interface to an application server (Network Application Function, NAF) 105. The BSF 102 has a Zh interface to a Home Subscriber System (HSS) 103, a Dz interface to a Server Locator Function (SLF) 104 and a Zn interface to the NAF 105.

Figure 2:
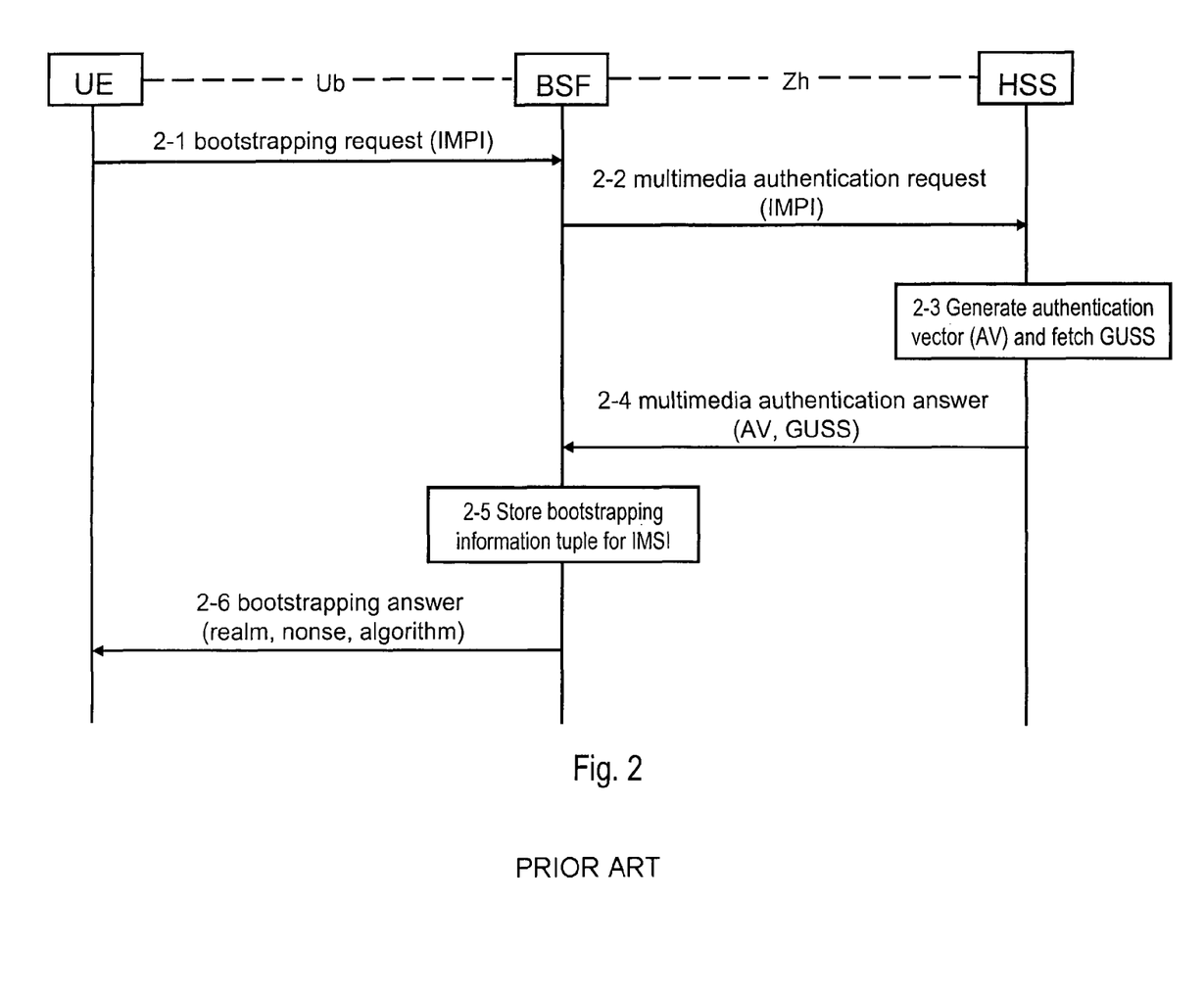
FIG. 2 shows a messaging diagram according to prior art.

FIG. 2 shows a messaging diagram illustrating the GAA/GBA bootstrapping procedure according to 3GPP specifications in the system of FIG. 1. First the UE starts the bootstrapping procedure with the BSF through the Ub interface by sending a bootstrapping request 2-1 including IMPI (IMS Private User Identity) of the UE's user.

The BSF requests user's authentication vector (AV) and GBA User Security Settings (GUSS) from the user's HSS through the Zh interface by sending a multimedia authentication request 2-2 including the IMPI of the UE's user. The multimedia authentication request is sent in the format of Multimedia-Auth-Request (MAR) message. The HSS generates the authentication vector and fetches the GUSS in phase 2-3 and supplies a multimedia authentication answer 2-4 including the authentication vector and the GUSS to the BSF. The multimedia authentication answer is sent in the format of Multimedia-Auth-Answer (MAA) message. In 3GPP the authentication vector comprises RAND (random challenge in authentication), AUTN (authentication token), XRES (expected response in authentication), CK (confidential key), and IK (integrity key).

If there are more than one HSS deployed in the network, the BSF may contact the SLF 104 through the Dz interface to find out which HSS should be contacted for that specific user prior to sending the multimedia authentication request 2-2. The SLF returns the address for the relevant HSS in response to a request.

The BSF stores the bootstrapping information tuple (comprising IMPI, key material and GUSS) for the IMPI in phase 2-5 and sends a bootstrapping answer 2-6 to the UE. Thereafter the BSF and the UE continue with the bootstrapping procedure through the Ub interface.

The NAF 105 may fetch authentication information (the key material stored in the BSF) from the BSF 102 through the Zn interface and thereby may authenticate the UE 101 at the start of an application session through the Ua interface or use the received key material otherwise to secure the communication.

A problem that some communication network operators have with GAA/GBA is that they do not (yet) have a HSS with diameter base access, whereby they cannot run GAA/GBA according to the 3GPP specifications.

SUMMARY OF THE INVENTION

According to a first aspect of the invention there is provided a method comprising receiving an authentication bootstrapping request related to a subscriber, requesting authentication information of said subscriber from a subscriber database, requesting security settings of said subscriber from a security setting database, receiving a response at least from one of the subscriber database and the security setting database, and proceeding with authentication bootstrapping at least partially on the basis of response(s) received.

A subscriber may mean one user, that is, the term subscriber may be equal to a user. Alternatively a subscription does not need to be bound to a particular user. For example, a company may have a subscription that may be used by more than one user. Specifications generally use the term user, but actually a subscriber is often meant.

In an embodiment of the invention the authentication information is requested from the subscriber database through a non-diameter interface, which may be for example a MAP/SS7 interface.

The method may further comprise requesting, from an address storage, address information for at least one of the subscriber database and the security setting database.

The security setting database may be for example a GUSS (GBA user security setting) database and the subscriber database may be for example a home location register or a visitor location register.

According to a second aspect of the invention there is provided a bootstrapping element, comprising an input operable to receive an authentication bootstrapping request related to a subscriber, and a processing unit configured to request authentication information of said subscriber from a subscriber database, to request security settings of said subscriber from a security setting database, to receive a response at least from one of the subscriber database and the security setting database, and to proceed with authentication bootstrapping at least partially on the basis of response(s) received.

According to a third aspect of the invention there is provided a security setting database, comprising a storage medium operable to store security settings related to a plurality of subscribers, and a processing unit configured to co-operate with a bootstrapping element and to provide to the bootstrapping element security settings related to a specific subscriber responsive to a request.

According to a fourth aspect of the invention there is provided an address storage element, comprising a storage medium operable to store address information of a related security setting database for a plurality of subscribers, and a processing unit configured to co-operate with a bootstrapping element and to provide to the bootstrapping element address information of a security setting database related to a specific subscriber responsive to a request.

In an embodiment of the invention the storage medium of the address storage is further operable to store address information of a related subscriber database for a plurality of subscribers, and said processing unit is further configured to provide to the bootstrapping element address information of a subscriber database related to a specific subscriber responsive to a request.

According to a fifth aspect of the invention there is provided a system comprising a subscriber database operable to store authentication information related to a plurality of subscribers, a security setting database operable to store security settings related to a plurality of subscribers, and a bootstrapping element operable to co-operate with the subscriber database and the security setting database, the bootstrapping element comprising an input operable to receive an authentication bootstrapping request related to a subscriber, and a processing unit configured to request authentication information of said subscriber from the subscriber database, to request security settings of said subscriber from the security setting database, to receive a response at least from one of the subscriber database and the security setting database, and to proceed with authentication bootstrapping at least partially on the basis of response(s) received.

The system may further comprise an address storage element operable to store, for a plurality of subscribers, address information of at least one of a related security setting database and a related subscriber database, and the processing unit of the bootstrapping element may be further configured to co-operate with the address storage element, and to request from the address storage element, address information of at least one of the subscriber database and the security setting database related to said subscriber.

According to a sixth aspect of the invention there is provided a memory medium comprising computer executable program code adapted to enable an apparatus to perform the method of the first aspect.

A benefit, which may be achieved with some embodiments of the invention, is that network operators may be allowed to use GBA (General Bootstrapping Architecture) according to 3GPP specifications and specifically SIM based GBA according to 3GPP TS 33.920 v. 7.1.0 with an old HLR and a new BSF without a need to move to 3G smart cards or HSS usage. Thus, an operator may take GBA into use with minimal changes to the network. Updating of a huge database like a HLR to a HSS may be a major effort and risk, since the updated database may not work immediately in the expected fashion. This may result in that the network cannot connect calls. For this reason, network operators prefer to minimise changes to the network.

It should be appreciated that subject matter of one embodiment related to one aspect may be combined with some other aspect or embodiment where applicable.

BRIEF DESCRIPTION OF THE DRAWINGS

The invention will be described, by way of example only, with reference to the accompanying drawings in which.

DETAILED SPECIFICATION

FIGS. 1 and 2 are discussed above in connection with prior art. In the following description, like numbers denote like parts.

Figure 3:
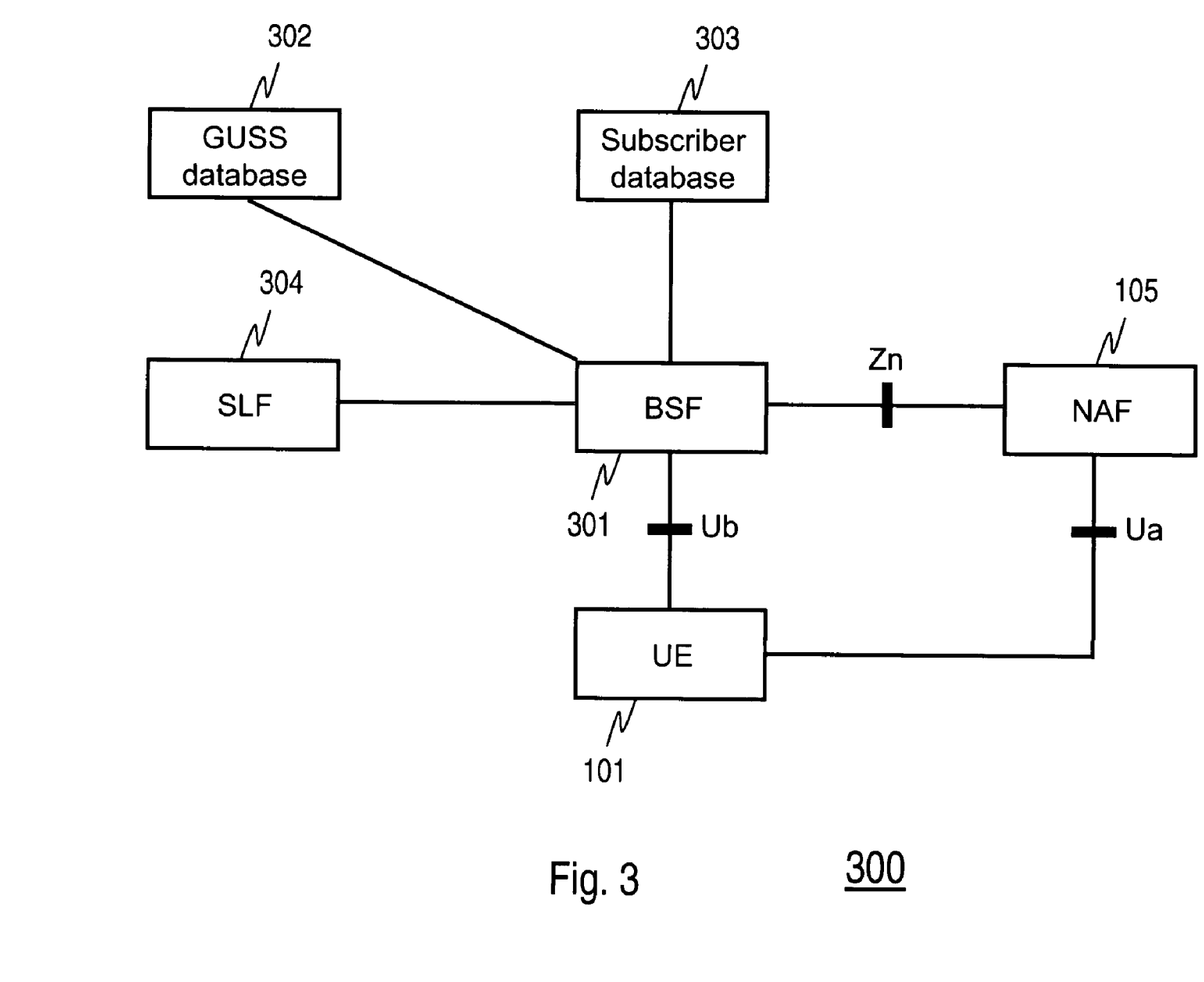
FIG. 3 shows a system according to an embodiment of the invention.

FIG. 3 shows a simplified block diagram of an authentication system 300 according to an embodiment of the invention. The system 300 comprises a user equipment (UE) 101, which is connected to an application server (network application function, NAF) 105 through a Ua interface like the system of FIG. 1. The UE may be any suitable communication device. The UE 101 has also a Ub interface to a bootstrapping entity 301, which is a bootstrapping server function (BSF) in this embodiment, and the BSF 301 has a Zn interface to the NAF 105.

However, the BSF 301 of this embodiment is not the same as the BSF 102 of FIG. 1. The BSF 301 is enabled to communicate with an address storage 304, which is a server locator function (SLF) in this embodiment, a security setting database 302, which is a GUSS (GBA User Security Settings) database in this embodiment, and a subscriber database 303. Also the SLF 304 is different from the SLF 104 of FIG. 1. The subscriber database 303 may be for example a home location register (HLR), that is, it does not need to be a HSS according to 3GPP specifications. Additionally the subscriber database may be some other database comprising authentication information (e.g. authentication vectors), such as a visitor location register (VLR).

The interface between the BSF and the subscriber database may be a non-diameter base interface, such as for example a MAP/SS7 (Mobile Application Part/Signalling System No 7) interface (MAP is part of SS7 protocol suite). MAP defines messages sent between mobile switches and databases to support user authentication, equipment identification, and roaming. Diameter base protocol is an authentication, accounting and authorization protocol, which is used in 3GPP specifications of GAA/GBA, but it is possible that it is not supported in older network elements. The diameter base protocol specification was finalized in 2003, hence network elements older than that are unlikely to support this protocol.

Thereby, the embodiment of the invention providing possibility to use MAP/SS7 protocol offers the benefit that GAA/GBA may be employed with older network elements that do not support the diameter base protocol.

The interface between the BSF 301 and the GUSS database 302 may be an LDAP (Lightweight Directory Access Protocol), XED (XML Enabled Directory), DSML (Directory Service Markup Language), SPML (Service Provisioning Markup Language), or SLP (Service Location Protocol) interface or some other suitable database interface.

A security setting database, such as the GUSS database 302, stores security settings comprising application and user specific parameters, which may include for example an authentication part, which includes a list of identities of the user needed for certain application (e.g. IMPUs (IM Public Identity), MSISDN, pseudonyms), and an authorisation part, which includes user permission flags (e.g. access to application allowed, type of certificates which may be issued). In addition, the parameters may comprise some key selection indication. The security setting may be for example the GUSS defined in Annex A of 3GPP specification TS 29.109 v. 7.4.0.

Additionally, the BSF 301 may have capabilities to have a (diameter base) Zh interface to a home subscriber system (HSS) and a Dz interface to a server locator function (SLF) according to 3GPP specifications.

Figure 4:
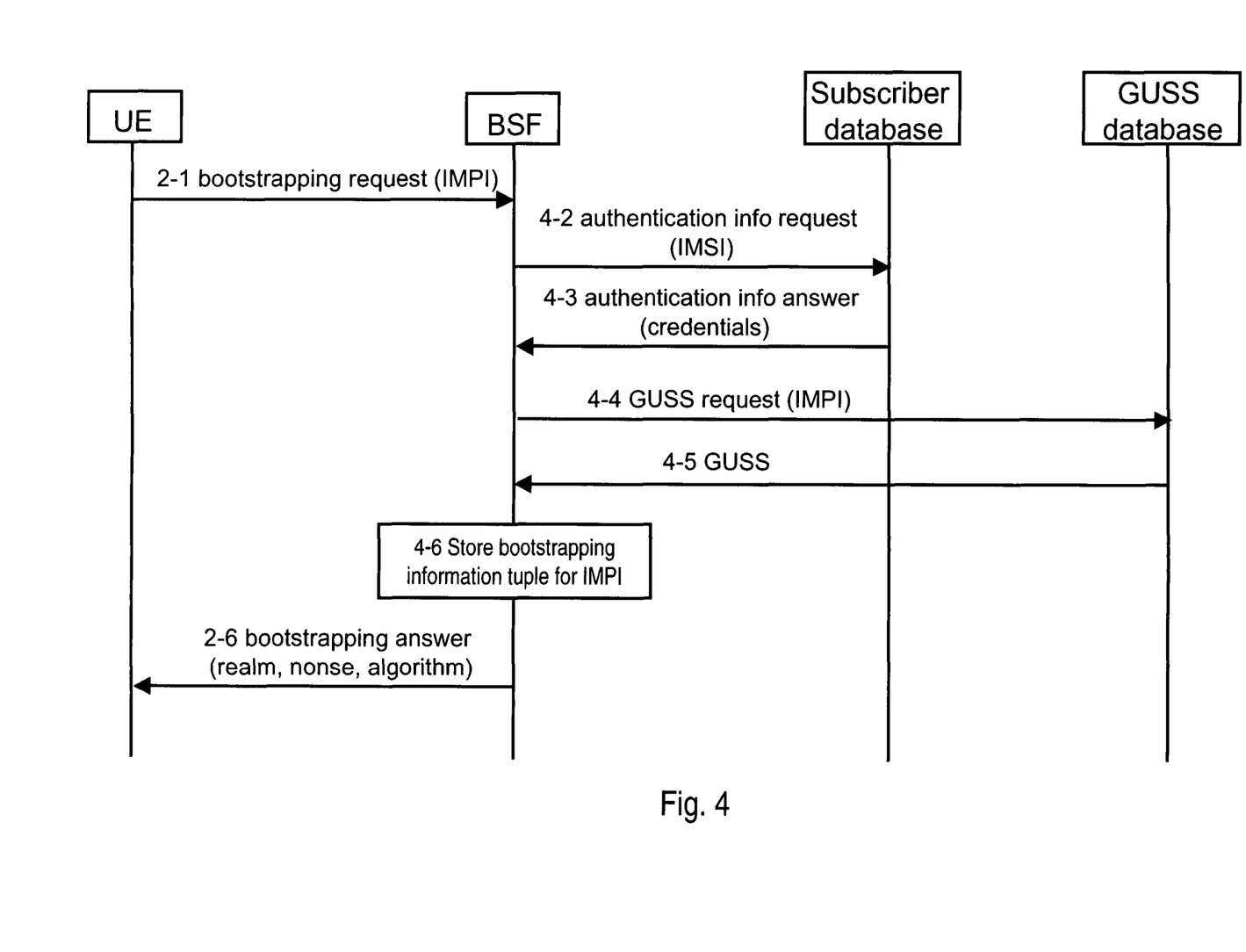
FIG. 4 shows a messaging diagram according to an embodiment of the invention.

FIG. 4 shows a messaging diagram illustrating the GAA/GBA bootstrapping procedure according to an embodiment of the invention in the system of FIG. 3. First the UE starts the bootstrapping procedure with the BSF through the Ub interface by sending a bootstrapping request 2-1 including IMPI (IMS Private User Identity) of the UE's user.

Then, the BSF requests authentication information for the user from the subscriber database by sending an authentication info request 4-2 comprising the IMSI (International Mobile Subscriber Identity) of the UE's user (included in the IMPI received from the UE). Alternatively some other identifier of the user may be included in the authentication info request 4-2. The authentication information request may be sent for example in the format of a MAP_SendAuthInfo message. The subscriber database responds with an authentication info answer 4-3 comprising credentials corresponding to the IMSI. The authentication information answer may be sent for example in the format of a MAP_SendAuthInfo-ack message. The credentials may comprise for example a triplet RAND, SRES (Signed Response), and Kc (Ciphering Key) or an authentication vector comprising RAND, AUTN, XRES, CK, and IK.

After this the BSF sends a GUSS request 44 comprising the IMPI to the GUSS database 302. The GUSS request 4-4 may also be some other request for security settings for a specific user identified in the request by some suitable identifier. The GUSS request 4-4 may be for example an LDAP, XED, DSML, SPML, SLP or similar database access protocol request. The GUSS database responds by returning the GUSS 4-5 for the IMPI. The GUSS database may be sorted by IMPI or by other user identifiers. Then the BSF continues to process the received credentials and the GUSS for example as specified in 3GPP specifications. That is, the BSF stores bootstrapping information tuple comprising IMPI, the related credentials (or key material) and GUSS and sends a bootstrapping answer 2-6 to the UE like in FIG. 2. Thereafter the BSF and the UE may continue with the bootstrapping procedure through the Ub interface.

Additionally, if the BSF already has a "old" GUSS stored for a specific user, the BSF may include in the GUSS request a timestamp indicating which version of the GUSS is already available in the BSF. In that case, if the GUSS database does not have any newer GUSS, it does not need to return the same GUSS to the BSF.

It should be noted that the order of sending messages 4-2 and 4-4 in FIG. 4 is not binding and that it may be possible that the BSF contacts the GUSS database before contacting the subscriber database or that the BSF contacts both of them simultaneously without waiting for one to respond first.

If there are more than one subscriber database and/or GUSS database deployed in the network, the BSF 301 may contact the SLF 304 to find out which database(s) should be contacted for that specific user prior to sending the requests 4-2 and 4-4.

Figure 5:
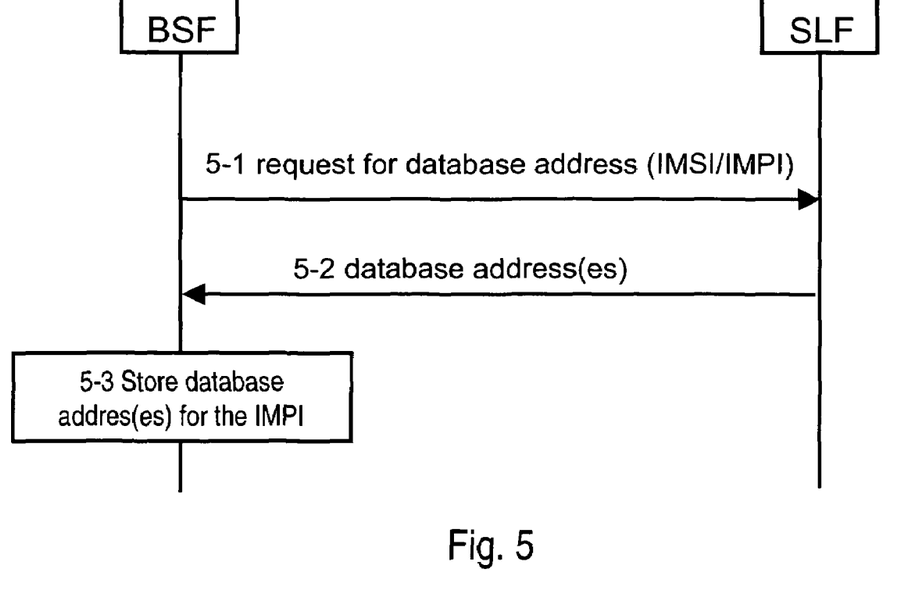
FIG. 5 shows a messaging diagram according to an embodiment of the invention.

FIG. 5 shows a messaging diagram of contacting the SLF (or other address storage) according to an embodiment of the invention. The BSF sends to the SLF a request for database address(es) 5-1 for a specific user. The request 5-1 may be a request according to the Zh interface, but the answer might be different from the standardized solution. The user may be identified in the request by IMSI or IMPI. The SLF responds with corresponding database address(es) 5-2. The SLF may return the corresponding subscriber database address or the corresponding GUSS database (or other security setting database) address or both of these. Then the BSF may store the received address(es) for future use in phase 5-3, but this is not mandatory.

The invention may be implemented for example by means of a computer program running on a suitable hardware platform or by means of any other suitable combination of hardware, software, special purpose circuits and/or logic.

Figure 6:
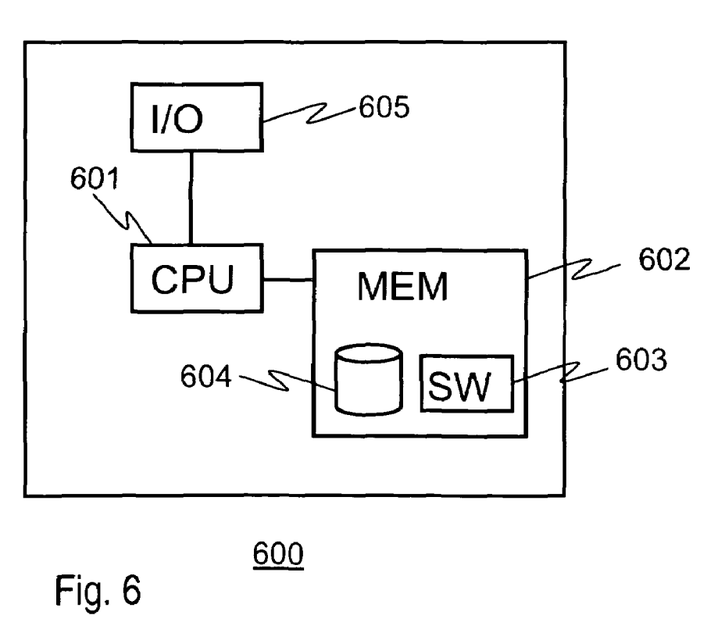
FIG. 6 shows a block diagram of an apparatus suited for implementing various embodiments of the invention.

FIG. 6 shows a block diagram of an apparatus 600 suited for implementing the various embodiments of the invention. The apparatus 600 may be a typical computer, such as, a general-purpose computer or a server, with possibly distributed functions. The apparatus comprises a processing unit 601 for controlling the apparatus and a memory 602 including a computer program code or software 603. The processing unit may be for example a central processing unit (CPU), a general-purpose processor, a microprocessor, a digital signal processor, an application specific integrated circuit, a field programmable gate array, a microcontroller or a combination of such elements. The memory may also include a database 604 storing for example authentication information, security setting information and/or address information depending on the implementation of the invention.

The software 603 includes instructions for the CPU 601 to control the apparatus 600 such as an operating system and different computer applications. The software 603 may comprise instructions for controlling the apparatus to provide some functionality of the invention. The instructions may for example control the apparatus to operate as a bootstrapping element, a security setting database element, a subscriber database element or an address storage element according to some embodiments of the invention. The instructions may also control the same apparatus to operate as more than one of the foregoing elements according to some embodiments of the invention. That is, the elements of the invention need not be physically separate elements but they may be also logically different elements running on the same physical hardware. The apparatus 600 further comprises an I/O (input/output) unit 605 such as a LAN (Local Area Network), Ethernet or WLAN (Wireless LAN) unit. The apparatus 600 could comprise also a user interface (not shown), such as a display and a keyboard, but the user interface may be implemented also by means of a remote connection through the I/O unit.

It should be appreciated that in this document, words comprise, include and contain are each used as open-ended expressions with no intended exclusivity.

Particular implementations and embodiments of the invention have been described by way of non-limiting examples relating to GBA and GUSS. It is clear to a person skilled in the art that the invention is not restricted to details of the embodiments presented above, but that it can be implemented in other embodiments using equivalent means without deviating from the characteristics of the invention. For example, the user equipment, the BSF, the SLF, the GUSS and the GUSS database of the preceding examples may be replaced by some other suitable communication device, bootstrapping element, address storage, security setting, and security setting database, respectively.

Furthermore, some of the features of the above-disclosed embodiments of this invention could be used to advantage without the corresponding use of other features. As such, the foregoing description should be considered as merely illustrative of the principles of the present invention, and not in limitation thereof. Hence, the scope of the invention is only restricted by the appended patent claims.

The invention claimed is:

1. A method comprising
receiving an authentication bootstrapping request related to a subscriber,
requesting authentication information of said subscriber from a home location register, comprising requesting an authentication vector corresponding to a mobile subscriber identity of the subscriber from the home location register over a first interface using a first protocol comprising a mobile application part protocol format,
requesting security settings of said subscriber from a security setting database separate from the home location register over a second interface using a protocol different than the first protocol, where said security setting database is a generic bootstrapping architecture user security setting database,
receiving a response from at least one of the home location register and the security setting database, and
proceeding with authentication bootstrapping based, at least in part, on the response received.

2. The method according to claim 1, where the first interface is a non-diameter interface.

3. The method according to claim 1, where the first interface is a mobile application part/signalling system number 7 interface.

4. The method according to claim 1, further comprising requesting, from an address storage, address information for at least one of the home location register and the security setting database.

5. The method according to claim 1, further comprising, requesting from a server locator function a database address for a specified user, and receiving from the server locator function, in response to the request, at least an address of the security setting database that is separate from the home location register.

6. The method according to claim 1, where authentication information from the home location register is stored at least in part in a database separate from the home location register.

7. The method according to claim 1, where the method is performed as a result of execution of software stored in a memory readable by a processing unit.

8. The method according to claim 1, where the requesting is in a map send authentication information format.

9. An apparatus, comprising
at least one processor; and
at least one memory including computer program code, where the at least one memory and the computer program code are configured, with the at least one processor, to cause the apparatus to at least:
receive an authentication bootstrapping request related to a subscriber,
request authentication information of said subscriber from a home location register, comprising requesting an authentication vector corresponding to a mobile subscriber identity of the subscriber from the home location register over a first interface using a first protocol comprising a mobile application part protocol format,
request security settings of said subscriber from a security setting database that is separate from said home location register over a second interface using a protocol different than the first protocol, where said security setting database is a generic bootstrapping architecture user security setting database,
receive a response from at least one of the home location register and the security setting database, and proceed with authentication bootstrapping based, at least in part, on the response received.

10. The apparatus according to claim 9, where the first interface is a non-diameter interface.

11. The apparatus according to claim 9, where the first interface is a mobile application part/signalling system number 7 interface.

12. The apparatus according to claim 9, where the computer program code is configured, with the at least one processor, to cause the apparatus to request, from an address storage, address information for at least one of the home location register and the security setting database.

13. The apparatus according to claim 9, where the computer program code is configure, with the at least one processor to cause the apparatus to:
request from a server locator function a database address for a specified user, and
receive from the server locator function, in response to the request, at least an address of the security setting database that is separate from the home location register.

14. The apparatus according to claim 9, where authentication information from the home location register is stored at least in part in a database separate from the home location register.

15. The apparatus according to claim 9, where request is in a map send authentication information format.

16. A security setting database, comprising
a storage medium operable to store security settings related to a plurality of subscribers having authentication vectors stored in at least one database separate from the security setting database where the security setting database is a generic bootstrapping architecture user security setting database, and
a processing unit configured to co-operate with a bootstrapping element and to provide to the bootstrapping element security settings related to a specific subscriber responsive to a request, where the request is following a first request using a first protocol to a home location register separate from the security setting database to provide an authentication vector corresponding to a mobile subscriber identity of a subscriber of the plurality of subscribers, and where the request uses a protocol different than the first protocol.

17. An address storage element, comprising
a storage medium operable to store address information of a related security setting database for a plurality of subscribers, where the security setting database stores security settings related to the plurality of subscribers having authentication vectors stored in a home location register separate from the security setting database, where each of the authentication vectors stored in the home location register corresponds to a mobile subscriber identity of a subscriber of the plurality of subscribers, where the home location register is responsive to a request, made over a first interface using a first protocol comprising a mobile application part protocol format, to the home location register for an authentication vector corresponding to a mobile subscriber identity of a subscriber of the plurality of subscribers, where the security setting database is responsive to requests for security settings, made over a second interface using a protocol different than the first protocol, to the security setting database, and where said security setting database is a generic bootstrapping architecture user security setting database, and a processing unit configured to co-operate with a bootstrapping element and to provide to the bootstrapping element address information of a security setting database related to a specific subscriber responsive to a request.

18. The address storage element according to claim 17, wherein said storage medium is further operable to store address information of a related home location register for a plurality of subscribers, and said processing unit is further configured to provide to the bootstrapping element address information of a home location register related to a specific subscriber responsive to a request.

19. A system comprising a home location register operable to store authentication information related to a plurality of subscribers, a security setting database operable to store security settings related to a plurality of subscribers, where the security setting database is separate from the home location register and where the security setting database is a generic bootstrapping architecture user security setting database, and a bootstrapping element operable to co-operate with the home location register and the security setting database, the bootstrapping element comprising an input operable to receive an authentication bootstrapping request related to a subscriber, and a processing unit configured to request an authentication vector corresponding to said subscriber from the home location register over a first interface using a first protocol comprising a mobile application part protocol format, to request security settings of said subscriber from the security setting database over a second interface using a protocol different than the first protocol, to receive a response from at least one of the home location register and the security setting database, and to proceed with authentication bootstrapping based, at least in part, on the response received.

20. The system according to claim 19, further comprising an address storage element operable to store, for a plurality of subscribers, address information of at least one of a related security setting database and a related home location register, wherein the processing unit of the bootstrapping element is further configured to co-operate with the address storage element, and to request from the address storage element, address information of at least one of the home location register and the security setting database related to said subscriber.

\* \* \* \* \*